(12) United States Patent
Wood et al.

(10) Patent No.: US 6,582,836 B2
(45) Date of Patent: Jun. 24, 2003

(54) CALCIUM SALT PROTECTIVE COATING AND METHOD OF FORMING

(75) Inventors: Thomas E. Wood, Owensboro, KY (US); Michael L. Austin, Memphis, TN (US)

(73) Assignee: Valley Products Company, Inc., Memphis, TN (US)

( * ) Notice: Subject to any disclaimer, the term of this patent is extended or adjusted under 35 U.S.C. 154(b) by 0 days.

(21) Appl. No.: 10/002,596

(22) Filed: Oct. 19, 2001

(65) Prior Publication Data

US 2003/0087116 A1 May 8, 2003

Related U.S. Application Data

(60) Provisional application No. 60/241,257, filed on Oct. 18, 2000.

(51) Int. Cl.$^7$ .............................. B32B 9/00; A23K 3/00; A01N 3/00
(52) U.S. Cl. .................. 428/689; 71/64.07; 71/901; 71/903; 426/89; 428/357; 428/402; 428/403; 428/702; 428/703
(58) Field of Search ................................. 428/689, 357, 428/402, 403, 702, 703; 426/89; 71/64.07, 901, 903

(56) References Cited

U.S. PATENT DOCUMENTS

| | | | |
|---|---|---|---|
| 3,908,045 A | | 9/1975 | Alterman et al. ........... 427/213 |
| 4,936,897 A | * | 6/1990 | Pipko et al. ................ 71/64.07 |

OTHER PUBLICATIONS

Kirk–Othmer "Encyclopedia of Chemical Technology," Fourth Edition; vol. 15: "Lime and Limestone," pp. 319–324; John Wiley & Sons: New York; 1995 (no month given).*

New Madrid Power Plant, "Plant Tries Soybean Byproduct to Control Dust", *Watt Matters* (newsletter, 1 page) (Aug. 5, 1994).

Dick Lee, "Save It With Soybeans", *Missouri Ruralist* 16 (2 pages) (Nov. 1996).

"Bale Toppers", *Missouri Ruralist* 12 (Dec. 1996; author unknown).

Valley Products Co., Inc., "Technical Data—SoyCoat 60" (1 page) (Feb. 1997).

"Soybean Product Holds Promise for Preserving Hay and Silage", *Commercial Agriculture* 5 (Winter 1997) (no month).

Dale G. Watson & J.P.Dunn, Reducing Forage Loss from Large Round Bales and Horizontal Silos using Soybean Soapstock or Blends of Soybean Soapstock with Predominately Long Chain Fatty Acids (4 pages) (Jan. 15, 1998).

Valley Products Co., Inc., "VALPRO AO–35M" (1 page) (Aug. 2001).

* cited by examiner

*Primary Examiner*—Robert R. Koehler
(74) *Attorney, Agent, or Firm*—Walker, McKenzie & Walker, PC

(57) ABSTRACT

A calcium salt protective coating formed in situ by combining fatty acids with lime, also the associated method of forming the protective coating in situ. The fatty acids are preferably vegetable fatty acids such as from soapstock byproduct skimmings produced during the manufacture of vegetable oil. Experimental testing has shown that the protective coating is substantially impervious to moisture. The protective coating is a suitable covering for hay bales, silage, coal piles, and road salt piles. Further experimental testing has shown that the present invention is also suited to environmental soil bioremediation ("landfarming") using microbes, in which the fatty acid ingredient, in addition to being used in formation of a protective coating that inhibits introduction of oxygen into the soil being treated, is also used as a carbon source for the microbial activity.

19 Claims, 2 Drawing Sheets

CALCIUM SALT PROTECTIVE COATING AND METHOD OF FORMING

CROSS REFERENCE TO RELATED APPLICATIONS

This application is a non-provisional application corresponding to pending U.S. Provisional Patent Application No. 60/241,257, filed Oct. 18, 2000, fully included by reference herein, and claims priority under 35 U.S.C. 119(e) thereof.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to water barrier coatings for materials left out in the weather, and in particular, to water barrier protective coatings formed in situ on materials left out in the weather, so that the materials become resistant to absorption of moisture.

2. Information Disclosure Statement

Beginning in 1994, Valley Products Company, Inc., assignee of the present invention and patent applications therefor, as well as other companies, investigated using vegetable oil products, as well as byproducts of vegetable oil processing operations, for providing protective coverings or coatings to protect materials from exposure to the elements. Specific applications involved such diverse materials as hay bales, agricultural silage, coal piles, and road salt piles, all of which suffer from moisture absorption when left outside exposed to the weather.

An Aug. 5, 1994, newsletter entitled *Watt Matters* from the New Madrid Power Plant at New Madrid, Mo., describes the use of "soapstock skimmings", a byproduct of the soybean oil refining process, being tested as a dust suppressant on coal stockpiles and gravel roads. Such soapstock skimmings are well-known in the prior art, and, as hereinafter described, can be used as a component ingredient when forming the protective coating of the present invention.

J. P. Dunn, of the Missouri Soybean Merchandising Council, is known to have used soybean soapstock skimmings under the trademark LiquiWrap as a preservative coating for hay bales as early as July 1995, and has suggested using soybean soapstock skimmings as a coating for piles of road salt to prevent moisture absorption.

An article entitled "Save it with Soybean" in the November 1996 issue of *Missouri Ruralist* magazine describes using this same soybean soapstock waste of soapstock skimmings as a forage preservative for treating corn silage and hay bales, in order to reduce spoilage and to thereby reduce forage loss. The article also notes that soybean soapstock waste is edible by cows, so that treatment of the forage by the soapstock does not reduce the utility of the forage as agricultural feed.

A promotional notice in the December 1996 issue of *Missouri Ruralist* magazine notes that Dunn Agribusinesses was spraying soybean soapstock skimmings sold under the trademark LiquiWrap onto bales of hay to form a protective waterproof barrier around the hay, and notes that the treated bales of hay could be fed directly to livestock, who would eat the soapstock skimmings covering along with the hay.

Valley Products Company, Inc., has long sold its SoyCoat 60 coating made from soybean oil feed stocks as a protective coating over silage and as a cattle feed additive.

An article entitled "Soybean Product Holds Promise for Preserving Hay and Silage" in the Winter 1997 issue of *Commercial Agriculture* discusses treatment of hay bales with a coating of soybean soapstock as a forage preservative, and also discusses use of soybean soapstock for dust abatement.

A project report submitted to the Missouri Soybean Merchandising Council by Dale G. Watson and J. P. Dunn on Jan. 15, 1998, entitled "Reducing Forage Loss from Large Round Bales and Horizontal Silos using Soybean Soapstock or Blends of Soybean Soapstock with Predominately Long Chain Fatty Acids", summarizes experimental findings concerning the application of soybean soapstock byproduct material as a silage coating.

None of these references, either singly or in combination, disclose or suggest the present invention, specifically, the use of fatty acids or soapstock skimmings together with lime to form a durable in situ protective coating to protect materials stored outdoors from moisture absorption.

These prior art attempts to use simple vegetable oil byproduct material proved to have limited success. The nature of the soapstock byproduct material being applied tended to produce uneven coating of the substrate material. The stability of the coating, when first applied, was affected by climatic conditions such as rainfall, which would tend to wash off the coating. Furthermore, there was found to be a relatively long curing period before a durable coating became formed. The overall degree of protection of the substrate material was thus quite variable depending on specific environmental conditions at the time of application and shortly thereafter. The soapstock byproduct material, while having the advantages of being edible by livestock and also being relatively inexpensive due to its production as a waste byproduct of the vegetable oil processing process, was thus found to be unacceptable as a protective coating because of the variability of the protection under normal environmental conditions.

It is therefore desirable to have a durable protective coating that can be formed in situ from inexpensive materials to provide a barrier that is substantially, if not totally, impervious to moisture. It is further desirable that such a protective coating use ingredients that are either biodegradable or otherwise environmentally safe, and that such a protective coating use ingredients that are approved by the U.S.F.D.A. and U.S.D.A. for use as animal feed ingredients so that such a protective coating can be safely used to protect animal feed and silage from spoilage due to moisture.

It is further desirable prepare liners for various environmental uses. Liners could be used for environmental soil bioremediation in a process generally referred to as landfarming. Landfarming is the land application of contaminated soil and its treatment by indigenous microorganisms. Landfarming is used to remediate petroleum wastes, wood-treating wastes, pesticides, and chlorinated solvent wastes. Often, soil contaminated with these wastes is applied on prepared high density polyethylene (HDPE) liners. Once all the soil is spread, it is covered with a similar liner and allowed to biodegrade. Most landfills also require specifically designed layered liners. Another application of the liner is in landfills.

It is still further desirable to provide a source of carbon and nutrients for soil and groundwater remediation. Often, soil contaminated with the above-mentioned wastes is augmented with organic supplements such as molasses, compost, or chicken manure so that biotreatment (the consumption of wastes by microorganisms) can occur more rapidly.

BRIEF SUMMARY OF THE INVENTION

The present invention is a calcium salt protective coating formed in situ by combining fatty acids with lime, and the present invention also includes the associated method of forming the protective coating in situ. The fatty acids are preferably vegetable fatty acids such as from soapstock byproduct skimmings produced during the manufacture of vegetable oil. Experimental testing has shown that the protective coating is substantially impervious to moisture. The protective coating is a suitable covering for hay bales, silage, coal piles, and road salt piles. Further experimental testing has shown that the present invention is also particularly suited to environmental soil bioremediation ("landfarming") using microbes, in which the fatty acid ingredient of the present invention, in addition to being used in formation of a protective coating that inhibits introduction of oxygen into the soil being treated, can also be used as a carbon source for the microbial activity.

It is an object of the present invention to provide a protective coating that can be formed in situ over materials left out in the weather and that is substantially impervious to moisture.

It is a further object of the present invention to provide a protective coating for use in environmental soil bioremediation ("landfarming") using microbes, such that the protective coating inhibits the introduction of oxygen into the soil being treated, and whereby the ingredients used in the process of formation of the protective coating in situ also provides a source of carbon for the microbial activity.

DETAILED DESCRIPTION OF THE INVENTION

Figure 1:
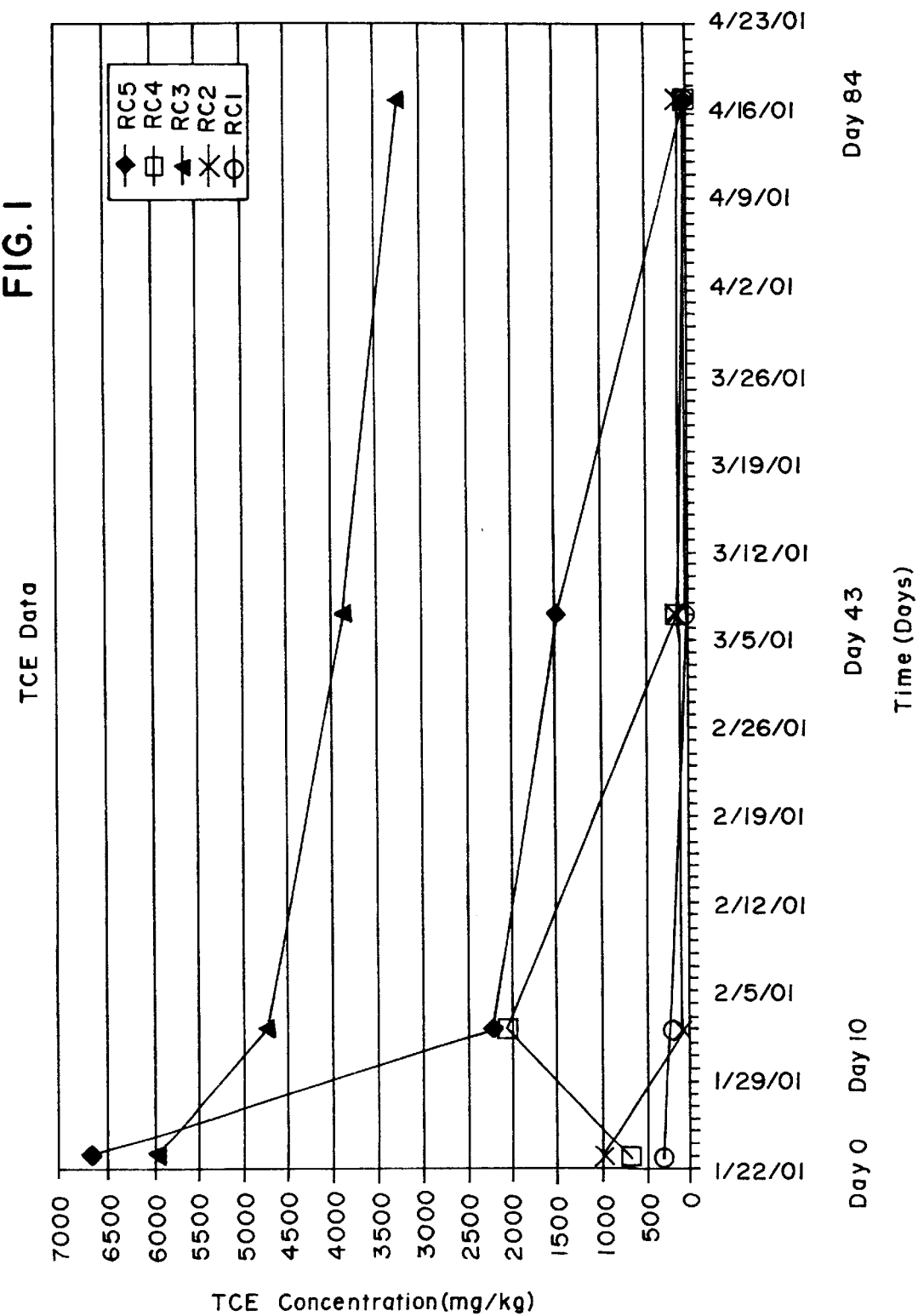
FIG. 1 is graph of experimental results of using the present invention to process soil contaminated with TCE using bioremediation.

While performing research unrelated to the present invention, it was discovered that calcium salts of soy-type fatty acids, formed by the rapid reaction of lime with various soy fatty acid sources, resulted in a very durable substance that was practically insoluble in water and that formed quickly. These characteristics of this newly-discovered calcium salt protective coating addressed the problems noted in the prior art when using a simple soapstock byproduct material to form a protective coating or barrier as heretofore described.

As is well-known by those skilled in the art, so-called "soapstock byproduct" is the byproduct that is filtered from vegetable oil during the manufacture of the vegetable oil. The soapstock typically contains about 30% to 40% fatty acid, with the remainder of the soapstock being water, lecithin, gums, etc. In a manner well-known to those skilled in the art, the raw soapstock is then acidified, as by sulfuric acid treatment of the soapstock, so as to cause the soapstock to separate into three layers, namely, a top layer of fatty acids, an interface byproduct layer therebelow called "skimmings", and a bottom layer of acidic water. The various layers are easily visible to the naked eye, and are each pumped off in sequence from the separated treated soapstock. The fatty acids from the top layer of the separated treated soapstock have long been considered the main product of the acidification treatment of the soapstock, and these fatty acids from the top layer of the separated treated soapstock are used in agricultural feed products, in a manner well-known to those skilled in the art. Heretofore, the soapstock skimmings and the acidic water were both considered waste products and discarded.

The soapstock skimmings, however, still contain some fatty acid components therewithin. A typical example of well-known soapstock byproduct skimmings is a product known by a product designation of AO-35M and sold under the trademark SoyCoat 5 by Valley Products Company, Inc., of Memphis, Tenn., assignee of the present invention and patent applications therefor. It shall be understood that the AO-35M soapstock byproduct skimmings product is used herein as a only one example of soapstock byproduct skimmings that could be used as a source of fatty acids for use in forming the protective coating of the present invention. The present invention may also be practiced with other sources of fatty acids and with other types of soapstock byproduct skimmings, and is not so limited as to only be practiced with the AO-35M soapstock byproduct skimmings product.

It shall be understood that the term "fatty acids", as used herein, includes not only soy-type fatty acids and fatty acids found in soapstock byproduct skimmings, but other sources of vegetable fatty acids such as, for example, the fatty acids that are obtained from the top layer of soapstock byproduct that has been treated by sulfuric acid, as heretofore described. The special attractiveness of using soapstock byproduct skimmings as a component ingredient in forming the calcium salt protective coating of the present invention is that the soapstock byproduct skimmings heretofore have been treated as a waste product, and the present invention makes this waste product now become useful rather than simply waste.

The AO-35M soapstock byproduct skimmings product is principally composed of corn oil and soybean oil fatty acids, waxes, gums, phospholipids, and residual water and salts. Other technical data is shown in Table 1, below:

TABLE 1

TECHNICAL DATA

SoyCoat 5 ™-AO-35M Soapstock Byproduct Skimmings

| | |
|---|---|
| Color | Dark brown |
| Odor | Characteristic, acrid |
| % Total Fatty Acid | 35 |
| % Free Fatty Acid | 25 |
| % Moisture | 50 |
| pH | 4.5–6 |
| Iodine Value, fatty acids | >120 |
| % Unsaponifiable | 4.0 |
| % Insoluble matter | 8.0 |
| % Phospholipids (lecithin) | 12–15 |

Table 2, below, shows the fatty acid composition by percent of a typical sample of the AO-35M soapstock byproduct skimmings, as analyzed by the Barrow-Agee Laboratories.

TABLE 2

FATTY ACID COMPOSITION
SoyCoat 5 ™-AO-35M Soapstock Byproduct Skimmings
Sample ID #6903, Laboratory ID #5096110

| Fatty Acid | | % |
|---|---|---|
| C4:0, | Butyric | 0.00 |
| C6:0, | Caproic | 0.00 |
| C8:0, | Caprylic | 0.00 |
| C9:0, | Perlargonic | 0.00 |
| C10:0, | Capric | 0.00 |
| C11:0, | Undecanoic | 0.00 |
| C12:0, | Lauric | 0.00 |
| C13:0, | Tridecanoic | 0.00 |
| C14:0, | Myristic | 0.14 |
| C14:1, | Myristoleic | 0.00 |
| C15:0, | Pentadecanoic | 0.00 |
| C15:1, | Pentadecenoic | 0.00 |
| C16:0, | Palmitic | 17.47 |
| C16:1, | Palmitoleic | 0.29 |
| C16:2, | Hexadecadienoic | 0.00 |
| C17:0, | Margaric | 0.12 |
| C17:1, | Margaroleic | 0.00 |
| C18:0, | Stearic | 4.68 |
| C18:1, | Oleic | 17.18 |
| C18:2, | Linoleic | 51.00 |
| C18:3, | Linolenic | 6.86 |
| C19:0, | Nonadecanoic | 0.30 |
| C20:0, | Arachidic | 0.43 |
| C20:1, | Gadoleic | 0.56 |
| C20:2, | Eicosadienoic | 0.00 |
| C22:3, | Eicosatrienoic | 0.00 |
| C21:0, | Heneicosanoic | 0.00 |
| C22:0, | Behenic | 0.76 |
| C22:1, | Erucic | 0.00 |
| C22:2, | Docosadienoic | 0.23 |
| C24:0, | Lignoceric | 0.00 |
| C24:1, | Nervonic | 0.00 |
| Other Fatty Acids | | 0.00 |

To further evaluate the effectiveness of the novel calcium salt protective coating of the present invention, a limited test using miniature "silos" made from five gallon (19-liter) plastic pails or buckets of straw were coated with a calcium salt protective barrier covering that was formed in situ by the reaction of lime with soybean soapstock byproduct skimmings, with the soapstock byproduct skimmings providing a source of fatty acids to react with the lime. These test silos of straw and corn silage, along with control samples, were evaluated over a test period of about three months.

The performance of the calcium salt protective coating of the present invention was evaluated by monitoring the weight change over time in each test silo, because a change in weight is associated with moisture change due to water penetration of the barrier cover. Additionally, the contents of each silo were qualitatively examined at the end of the experimental trials. The findings from these experiments, hereinafter described, indicated that the application of the fatty-acid containing material first, followed by the application of lime thereontop, yielded the best results.

In one set of five buckets, straw was packed into the buckets. In the other set of five buckets, silage was packed. Two holes were drilled in the bottom of all buckets to facilitate drainage. The buckets were packed in such a way that the level of the material was above the top edge of the bucket and was domed to allow water runoff.

In the first bucket of each set, no covering was applied, as a control. In the second bucket, a sheet of black plastic was used as the protective covering. In the third bucket, a layer of approximately 0.5 inch (1.3 cm.) of AO-35M soapstock byproduct skimmings was applied. In the fourth bucket, a layer of 0.25 inches (0.64 cm.) of powdered hydrated lime. The weights of AO-35M soapstock byproduct skimmings and lime that were applied were recorded. The initial weights of the silos were recorded after application of their respective protective coverings.

The buckets were weighed weekly for eleven weeks and the percent increase in weight due to rainwater absorption was calculated as compared to the initial weight, as summarized in Tables 3 and 4, below. The formula used in calculating the percent of gain in weight by week was:

$$\% \text{ Gain in Weight} = \frac{\text{Current Weight} - \text{Initial Weight}}{\text{Initial Weight}} \times 100$$

and the results for successive weeks, beginning with the fifth week after the initiation of the experimental testing, are shown. First, the results of testing of various coverings and coatings over straw, as summarized in Table 3:

TABLE 3

EXPERIMENTAL TESTING OF VARIOUS COVERINGS OVER STRAW
Percent of Gain in Weight by Week, as Compared to Initial Weight

| Bucket | Covering/Coating | Week 5 | Week 6 | Week 7 | Week 8 | Week 9 | Week 10 | Week 11 |
|---|---|---|---|---|---|---|---|---|
| 1 | None | 139.0 | 151.4 | 160.2 | 163.2 | 133.7 | 140.8 | 145.9 |
| 2 | Plastic | 0 | 0 | 0 | 0 | 0 | 0 | 0 |
| 3 | AO-35M Only | 122.0 | 132.7 | 136.3 | 138.8 | 135.0 | 143.2 | 141.6 |
| 4 | Lime first, then AO-35M | 87.0 | 94.1 | 94.9 | 98.1 | 117.8 | 125.6 | 128.9 |
| 5 | AO-35M, then Lime | 32.0 | 32.8 | 34.3 | 34.7 | 74.8 | 72.8 | 79.2 | and second, the testing of various coverings and coatings over agricultural silage, as summarized in Table 4:

TABLE 4

EXPERIMENTAL TESTING OF VARIOUS COVERINGS OVER SILAGE
Percent of Gain in Weight by Week, as Compared to Initial Weight

| Bucket | Covering/Coating | Week 5 | Week 6 | Week 7 | Week 8 | Week 9 | Week 10 | Week 11 |
|---|---|---|---|---|---|---|---|---|
| 1 | None | 12.0 | 19.5 | 20.7 | 13.2 | 14.5 | 21.9 | 23.5 |
| 2 | Plastic | 0 | 0 | 0 | 0 | 0 | 0 | 0 |
| 3 | AO-35M only | 18.0 | 6.3 | 22.0 | 25.4 | 27.8 | 33.6 | 37.1 |
| 4 | Lime first, then AO-35M | 3.0 | 5.3 | 6.5 | 6.2 | 6.0 | 8.8 | 12.5 |
| 5 | AO-35M, then Lime | 0.1 | 1.6 | 2.0 | 13.0 | 12.1 | 13.9 | 14.5 |

At the end of the test period the buckets were emptied and their contents examined. For the buckets of straw, the following results were observed as shown in Table 5, below:

TABLE 5

EXPERIMENTAL TESTING OF VARIOUS
COVERINGS OVER STRAW
Observations, by Bucket, at End of Testing

| Bucket | Observations |
|---|---|
| 1 | In the lower part of the silo bucket, about 3/4 of the straw is black and spoiled. The remainder of the straw is damp. |
| 2 | Very dry. No change from initial state. |
| 3 | Mostly black and very wet and spoiled. |
| 4 | About 1/2 black but very dry and well preserved near top (underneath the protective coating). Protective coating crumbled when emptied out. |
| 5 | Less than 1/2 black. More well-preserved underneath the protective coating than in straw silo bucket #4. Protective coating remained intact when emptied out. |

For the buckets of silage, the following results were observed as shown in Table 6, below:

TABLE 6

EXPERIMENTAL TESTING OF VARIOUS
COVERINGS OVER SILAGE
Observations, by Bucket, at End of Testing

| Bucket | Observations |
|---|---|
| 1 | Mostly spoiled. Extremely bad odor. |
| 2 | Dry with no spoilage. |
| 3 | Same as silage silo bucket #1, above. |
| 4 | Less spoilage at top, under protective coating, than silage silo buckets #1 and #3. Protective coating crumbled when emptied out. |
| 5 | Less spoilage at top, under protective coating, than silage silo bucket #4. Protective coating remained intact when poured out. |

These test results indicated that the present invention is suitable and effective as a flexible protective coating over straw and silage, and that the preferred method of forming the protective coating is to apply a coating of the fatty acid component, e.g., AO-35M soapstock byproduct skimmings, first, followed by application of lime thereontop, so as to cause the chemical reaction that creates the calcium salt protective coating of the present invention. This sequence provides the most stable protective barrier with the best moisture protection and the least spoilage. The calcium salt protective coating of the present invention is demonstrated to be clearly superior to a coating of soapstock byproduct skimmings alone. The water that did get into the buckets to which the protective coating of the present invention had been applied appeared to go through the gap that formed between the protective coating and the sides of the bucket, indicating that, in large-scale applications, it would be important to form the top of the protected silage in a dome and to overlap the coating over the edge of the silo so that water would not run into a gap between the protective coating and the edge of the silo. Any gaps in the coating should be avoided.

Based on these trials, it appears that significantly less water penetration and absorption is observed when the protective coating is formed in situ by first applying the fatty acid component, followed by application of lime. The straw and silage contained in the test silos, prepared as described above, also showed significantly improved qualitative results because the silage in the top portion of the silos, immediately below the coating, was very well preserved.

If desired, a double protective coating could be applied by first applying the fatty acid component, then applying lime to form a first layer of calcium salt protective coating, followed by another coating of the fatty acid component atop the first layer of calcium salt protective coating, then applying lime to this second coating of the fatty acid component, so as to form a second layer of calcium salt protective coating.

Table 7, below, shows the fatty acid composition by percent of vegetable fatty acids from a typical sample of well-known corn/soya soapstock, as analyzed by the Barrow-Agee Laboratories.

TABLE 7

FATTY ACID COMPOSITION
Vegetable Fatty Acids from Corn/Soya Soapstock Sample
Sample ID #10347, Laboratory ID #256828

| Fatty Acid | | % |
|---|---|---|
| C4:0, | Butanoic (Butyric) | 0.00 |
| C5:0, | Pentanoic (Valeric) | 0.00 |
| C6:0, | Hexanoic (Caproic) | 0.00 |
| C7:0, | Hepanoic (Enanthic) | 0.00 |
| C8:0, | Octanoic (Caprylic) | 0.00 |
| C9:0, | Nonanoic (Perlargonic) | 0.00 |
| C10:0, | Decanoic (Capric) | 0.00 |
| C11:0, | Undecanoic | 0.00 |
| C11:1, | Undecenoic (Undecylenoic) | 0.00 |
| C12:0, | Dodecanoic (Lauric) | 0.00 |
| C12:1, | Dodecenoic | 0.00 |
| C13:0, | Tridecanoic | 0.00 |
| C13:1, | Tridecenoic | 0.00 |
| C14:0, | Tetradecanoic (Myristic) | 0.13 |
| C14:1, | Tetradecenoic (Myristoleic) | 0.00 |
| C15:0, | Pentadecanoic | 0.00 |
| C15:1, | Pentadecenoic | 0.00 |
| C16:0, | Hexadecanoic (Palmitic) | 13.19 |
| C16:1, | Hexadecenoic (* Palmitoleic) | 0.13 |
| C16:2, | Hexadecadienoic | 0.00 |

TABLE 7-continued

FATTY ACID COMPOSITION
Vegetable Fatty Acids from Corn/Soya Soapstock Sample
Sample ID #10347, Laboratory ID #256828

| Fatty Acid | | % |
|---|---|---|
| C16:4, | Hexadecatetradienoic | 0.00 |
| C17:0, | Heptadecanoic (Margaric) | 0.12 |
| C17:1, | Heptadecenoic (Margaroleic) | 0.00 |
| C18:0, | Octadecanoic (Stearic) | 3.25 |
| C18:1, | Octadecenoic (* Oleic) | 23.50 |
| C18:2, | Octadecadienoic (* Linoleic) | 51.72 |
| C18:3, | Octadecatrienoic (* Linolenic) | 6.15 |
| C18:4, | Octadecatetraenoic | 0.36 |
| C19:0, | Nonadecanoic | 0.00 |
| C19:1, | Nonadecenoic | 0.00 |
| C20:0, | Eicosanoic (Arachidic) | 0.32 |
| C20:1, | Eicosenoic (* Gadoleic) | 0.45 |
| C20:2, | Eicosadienoic | 0.00 |
| C20:3, | Eicosatrienoic | 0.00 |
| C20:4, | Eicosatetraenoic (* Arachidonic) | 0.00 |
| C20:5, | Eicosapentaenoic | 0.00 |
| C21:0, | Heneicosanoic | 0.00 |
| C22:0, | Docosanoic (Behenic) | 0.41 |
| C22:1, | Docosenoic (* Erucic) | 0.00 |
| C22:2, | Docosadienoic | 0.00 |
| C22:3, | Docosatrienoic | 0.00 |
| C22:4, | Docosatetraenoic | 0.00 |
| C22:5, | Docosapentaenoic | 0.00 |
| C22:6, | Docosahexaenoic | 0.00 |
| C24:0, | Tetracosanoic (Lignoceric) | 0.29 |
| C24:1, | Tetracosenoic (Nervonic) | 0.00 |
| Other Fatty Acids | | 0.00 |

* Reported as sum of all isomers of the predominant fatty acid.

Table 8, below, shows the fatty acid composition by percent of a typical sample of mixed acidulated soapstock of vegetable fatty acids from rice/peanut stock (without cotton oils), as analyzed by the Barrow-Agee Laboratories.

TABLE 8

FATTY ACID COMPOSITION
Mixed Acidulated Soapstock Sample of Vegetable Fatty Acids
from Rice/Peanut Stock
Sample ID #8562, Laboratory ID #6137031

| Fatty Acid | | % |
|---|---|---|
| C4:0, | Butyric | 0.00 |
| C6:0, | Caproic | 0.00 |
| C8:0, | Caprylic | 0.00 |
| C9:0, | Perlargonic | 0.00 |
| C10:0, | Capric | 0.00 |
| C11:0, | Undecanoic | 0.00 |
| C12:0, | Lauric | 0.00 |
| C13:0, | Tridecanoic | 0.00 |
| C14:0, | Myristic | 0.26 |
| C14:1, | Myristoleic | 0.00 |
| C15:0, | Pentadecanoic | 0.04 |
| C15:1, | Pentadecenoic | 0.00 |
| C16:0, | Palmitic | 16.42 |
| C16:1, | Palmitoleic | 0.33 |
| C16:2, | Hexadecadienoic | 0.00 |
| C17:0, | Margaric | 0.09 |
| C17:1, | Margaroleic | 0.06 |
| C18:0, | Stearic | 3.07 |
| C18:1, | Oleic | 29.70 |
| C18:2, | Linoleic | 45.57 |
| C18:3, | Linolenic | 3.92 |
| C19:0, | Nonadecanoic | 0.00 |
| C20:0, | Arachidic | 0.47 |
| C20:1, | Gadoleic | 0.07 |
| C20:2, | Eicosadienoic | 0.00 |
| C20:3, | Eicosatrienoic | 0.00 |
| C21:0, | Heneicosanoic | |

TABLE 8-continued

FATTY ACID COMPOSITION
Mixed Acidulated Soapstock Sample of Vegetable Fatty Acids
from Rice/Peanut Stock
Sample ID #8562, Laboratory ID #6137031

| Fatty Acid | | % |
|---|---|---|
| C22:0, | Behenic | 0.00 |
| C22:1, | Erucic | 0.00 |
| C22:2, | Docosadienoic | 0.00 |
| C24:0, | Lignoceric | 0.00 |
| C24:1, | Nervonic | 0.00 |
| Other Fatty Acids | | 0.00 |

Encouraged by these preliminary results, additional experimental testing was performed to further evaluate the utility of the protective coating of the present invention as a flexible and water-repellent protective covering for silage, and to evaluate the performance of the protective coating of the present invention as compared with prior art coverings such as heavy black plastic liners, and also to evaluate the effect of varying the thickness of the protective coating of the present invention.

Figure 2:
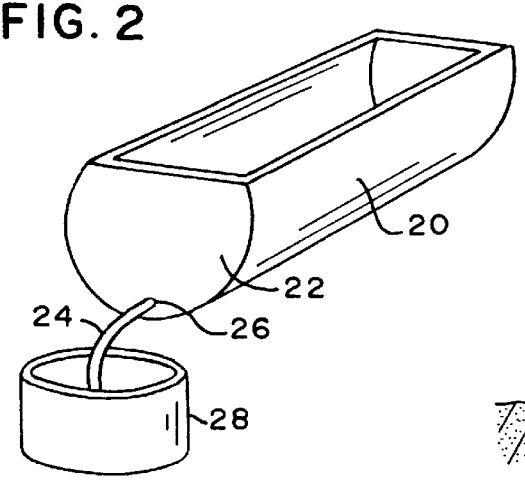
FIG. 2 is a pictorial perspective view showing a test drum used in experimental testing of the protective coating of the present invention.

To perform the testing, seven (7) fifty-five gallon (208 liter) plastic drums 20 were laid on their sides and were cut to provide an 18 by 34 inch (46×86 cm.) opening on the side of the drum, facing up, having an area of 612 square inches (3948 square cm.). Referring to FIG. 2, on the end 22 of the drum (where bungs were located), a hole was drilled at the lowest point and a plastic tube 24 was inserted. The connection 16 of the tube 24 with the drum 20 was sealed with silicone. The drainage tube 24 was connected to the raised spout of a five-gallon (19 liter) pail 28 to collect any liquid draining from the drum 20. The collection vessel 28 is thus seen to be a five-gallon (19 liter) pail with a stopper affixed to the raised pouring spout of the pail 28. The seven drums were securely mounted individually on wooden pallets to prevent rolling. A piece of screen weighted with pea gravel was used to eliminate possible plugging of the drainage tube. Each drum and its corresponding collection pail were numbered 1 through 7 and tare weights were recorded. Each drum was then filled with silage and the silage was then compressed. The moisture content of the silage was analyzed. The silage was mounded to resemble the original shape of the drum before the side section was removed, and the silage was allowed to overhang the edges of the opening. The drums were raised and slanted slightly to provide easy drainage into the five-gallon (19 liter) collection pail.

The drums were then covered with the following coverings, as described in Table 8.1, below. The Liquid Corn/Soya Fatty Acid is denoted by the acronym "LFA". The slurried lime is a 40% (by wt.) aqueous slake calcium oxide.

TABLE 8.1

EXPERIMENTAL TESTING OF VARIOUS COVERINGS
OVER SILAGE
Coating Descriptions, by Drum

| Drum | Coating Description |
|---|---|
| 1 (Control) | Hardware cloth fastened with plastic strapping. |
| 2 | Double layer of 6-mil black plastic fastened with plastic strapping. |
| 3 | Single layer 3/4 inch (1.9 cm.) thick LFA. |

TABLE 8.1-continued

EXPERIMENTAL TESTING OF VARIOUS COVERINGS
OVER SILAGE
Coating Descriptions, by Drum

| Drum | Coating Description |
|---|---|
| 4 | Single layer 3/4 inch (1.9 cm.) thick LFA followed with a layer of slurried lime. |
| 5 | Layer of lime slurry followed by a layer of 3/4 inch (1.9 cm.) thick LFA followed by a final layer of lime slurry. |
| 6 | Single layer 1.25 inch (3.18 cm.) LFA followed with a layer of lime slurry. |
| 7 | Layer of lime slurry followed by a layer of 1.25 inch (3.18 cm.) LFA followed by a final layer of lime slurry. |

Each drum was weighed after the respective coating was added, and the drums were placed outside in open areas for three months, from Dec. 29, 2000, until Mar. 28, 2001.

The following data was collected at periodic intervals: the total weight of the drum, the total water collected in the five-gallon (19 liter) collection pail, the total rainfall, and the final moisture content of silage in each drum. The drum weight data is shown in Tables 9A, 9B, and 9C, below, and the rainfall data is shown in Table 9D, below.

The initial moisture content of the silage was an average of 65.2%. The final moisture content of the silage for each drum is shown in Table 8.2, below, along with the percentage of change in moisture content for each drum.

TABLE 8.2

EXPERIMENTAL TESTING OF VARIOUS COVERINGS
OVER SILAGE
Final Moisture Content and Percentage of Change, by Drum

| Drum | Final Moisture Content % of Silage | % Change |
|---|---|---|
| 1 | 82.4 | +26.38 |
| 2 | 61.3 | −5.98 |
| 3 | 69.8 | +7.06 |

TABLE 8.2-continued

EXPERIMENTAL TESTING OF VARIOUS COVERINGS
OVER SILAGE
Final Moisture Content and Percentage of Change, by Drum

| Drum | Final Moisture Content % of Silage | % Change |
|---|---|---|
| 4 | 66.5 | +1.99 |
| 5 | 67.7 | +3.83 |
| 6 | 78.5 | +20.40 |
| 7 | 68.8 | +5.52 |

Drum 1 served as the control for this experiment. As expected with a covering of hardware cloth, the precipitation (rainfall) readily absorbed into and through the silage.

Drum 2 served as the current method for covering silage. Results show a reduction in total weight, probably due to evaporation (silage moisture reduced by 5.98%). At the end of the experiment, some water drained off, showing that rain must have gotten under the side edges of the cover.

Drum 3 covering was LFA only, which did absorb and allow some water through as expected. Silage moisture increased 7.06%.

Drums 4 and 5 used only a thin ¾ inch (1.9 cm.) layer of LFA with the lime slurry, and results showed only a minor increase in the moisture content and overall weight. No water drained from either of drums 4 or 5. Some water passed through or around the coatings as reflected in the slight increase in silage moisture (1.99% and 3.83%, respectively, for drums 4 and 5).

Drum 6 formed a crack in the covering soon into the experiment, and the data is invalid.

Drum 7 showed similar results to drums 4 and 5, but with slight increase in water passage. Silage moisture increased by 5.52%.

Table 9A, immediately below, shows the gross weights (in pounds) of the various drums on successive weeks, as taken on approximately weekly sampling intervals.

TABLE 9A

EXPERIMENTAL TESTING OF VARIOUS COVERINGS OVER SILAGE
Gross Weights (in Pounds) of Drums on Successive Weeks
Dec. 29, 2000–Mar. 28, 2001

| Drum | Dates | | | | | | | | | % Weight Change |
|---|---|---|---|---|---|---|---|---|---|---|
| | 12/29 | 1/8 | 1/16 | 1/22 | 1/30 | 2/5 | 2/19 | 3/5 | 3/28 | |
| 1 | 276.0 | 276.2 | 294.2 | 321.6 | 334.9 | 330.0 | 373.9 | 369.3 | 336.2 | 21.81 |
| 2 | 277.5 | 274.2 | 274.6 | 274.7 | 270.3 | 265.2 | 268.8 | 262.4 | 235.4 | −15.17 |
| 3 | 304.0 | 303.6 | 308.1 | 311.9 | 310.6 | 308.4 | 333.8 | 343.9 | 331.5 | 9.05 |
| 4 | 305.5 | 305.0 | 309.7 | 313.1 | 312.6 | 310.5 | 324.5 | 326.4 | 318.9 | 4.39 |
| 5 | 296.0 | 296.0 | 303.3 | 308.5 | 309.5 | 306.1 | 322.1 | 323.7 | 310.3 | 4.83 |
| 6 | 310.5 | 310.8 | 318.7 | 327.3 | 328.2 | 325.7 | 350.7 | 351.4 | 333.8 | 7.50 |
| 7 | 308.5 | 308.5 | 312.3 | 316.0 | 317.4 | 315.8 | 336.8 | 337.7 | 323.5 | 4.86 |

Table 9B, immediately below, shows the amount of drainage water, by weight in pounds, collected from each of the various drums.

TABLE 9B

EXPERIMENTAL TESTING OF VARIOUS COVERINGS OVER SILAGE
Collected Drainage Water (in Pounds) from Drums on Successive Weeks
Dec. 29, 2000–Mar. 28, 2001

| Drum | 12/29 | 1/8 | 1/16 | 1/22 | 1/30 | 2/5 | 2/19 | 3/5 | 3/28 | Total H$_2$O Collected |
|---|---|---|---|---|---|---|---|---|---|---|
| 1 | 0.0 | 0.0 | 0.0 | 5.1 | 3.0 | 0.0 | 44.9 | 32.2 | 26.6 | 111.8 |
| 2 | 0.0 | 0.0 | 0.0 | 0.0 | 0.0 | 0.0 | 0.2 | 0.0 | 4.1 | 4.3 |
| 3 | 0.0 | 0.0 | 0.0 | 0.0 | 0.0 | 0.0 | 2.6 | 6.1 | 6.5 | 15.2 |
| 4 | 0.0 | 0.0 | 0.0 | 0.0 | 0.0 | 0.0 | 0.0 | 0.0 | 0.0 | 0.0 |
| 5 | 0.0 | 0.0 | 0.0 | 0.0 | 0.0 | 0.0 | 0.0 | 0.0 | 0.0 | 0.0 |
| 6 | 0.0 | 0.0 | 0.0 | 3.7 | 2.8 | 0.0 | 31.8 | 28.4 | 19.4 | 86.1 |
| 7 | 0.0 | 0.0 | 0.0 | 0.0 | 0.0 | 0.0 | 7.9 | 4.3 | 5.2 | 17.4 |

Table 9C shows the gross weights, in pounds, of the various drums with the weight of their drained water included, and is simply the addition of the weekly data from Tables 9A and 9B. Also shown is the percent of weight change observed at the end of the experiment, as compared with the initial weights, in pounds, using the combined data of Table 9C.

TABLE 9C

EXPERIMENTAL TESTING OF VARIOUS COVERINGS OVER SILAGE
Gross Weights (in Pounds) of Drums including Drained Water on Successive Weeks
Dec. 29, 2000–Mar. 28, 2001

| Drum | 12/29 | 1/8 | 1/16 | 1/22 | 1/30 | 2/5 | 2/19 | 3/5 | 3/28 | % Weight Change |
|---|---|---|---|---|---|---|---|---|---|---|
| 1 | 276.0 | 276.2 | 294.2 | 326.7 | 337.9 | 330.0 | 418.8 | 401.5 | 362.8 | 31.45 |
| 2 | 277.5 | 274.2 | 274.6 | 274.7 | 270.3 | 265.2 | 269.0 | 262.4 | 239.5 | −13.69 |
| 3 | 304.0 | 303.6 | 308.1 | 311.9 | 310.6 | 308.4 | 336.4 | 350.0 | 338.0 | 11.18 |
| 4 | 305.5 | 305.0 | 309.7 | 313.1 | 312.6 | 310.5 | 324.5 | 326.4 | 318.9 | 4.39 |
| 5 | 296.0 | 296.0 | 303.3 | 308.5 | 309.5 | 306.1 | 322.1 | 323.7 | 310.3 | 4.83 |
| 6 | 310.5 | 310.8 | 318.7 | 331.0 | 331.0 | 325.7 | 382.5 | 379.8 | 353.2 | 13.75 |
| 7 | 308.5 | 308.5 | 312.3 | 316.0 | 317.4 | 315.8 | 344.7 | 342.0 | 328.7 | 6.55 |

Table 9D, immediately below, shows the amount of rainfall collected, by weight in pounds, during the period of the experiment. The weight is pounds is based on a volume from inches of rainfall over a surface area of an 18 by 34 inch (46×86 cm.) opening having an area of 612 square inches (3948 square cm.).

TABLE 9D

EXPERIMENTAL TESTING OF VARIOUS COVERINGS OVER SILAGE
Rainfall Collected on Successive Weeks of Experiment
Dec. 29, 2000–Mar. 28, 2001

| Drum | 12/29 | 1/8 | 1/16 | 1/22 | 1/30 | 2/5 | 2/19 | 3/5 | 3/28 | Total Change |
|---|---|---|---|---|---|---|---|---|---|---|
| Inches | | 0.1 | 0.83 | 1.5 | 1.05 | 0 | 1.9 | 1.5 | 0.9 | 7.78 |
| Pounds | | 2.21 | 18.32 | 33.1 | 23.17 | 0 | 41.93 | 33.1 | 19.86 | 171.69 | and wind erosion. The results compared favorably with heavy plastic covering, the traditional prior art covering of choice. There was no drainage from two of the drums using the protective coating of the present invention, as compared to some drainage from the drum with the heavy plastic. As a silage coating, the coating of the invention has an advantage over the plastic in that the coating can also be used as feed for animals. Allowing the cover to be used along with the silage as feedstuff material eliminates disposal concerns for the covering. Furthermore, in field applications, plastic can be blown off or torn, whereas the coating of the present invention is more resistant to being blown off.

The silage had a tendency to shrink over the period of the experiment, and this shrinkage seemed to have a detrimental effect upon the thicker versions of the protective coating of the present invention. As the silage shrank, the thicker versions were less flexible and had more of a tendency to crack. The thinner versions of the protective coating of the The present invention was found to be suitable and effective as a flexible protective coating, resistant to water present invention were more water-resistant and more flexible, giving a more effective covering with less material.

The present invention is thus seen to be a new approach that utilizes the unique properties of insoluble calcium fatty acid salts produced in situ by first applying liquid vegetable fatty acids onto a surface that is to be protected, followed by the immediate application of either dry or slurried lime. The resulting neutralization reaction creates a flexible, water-impervious protective coating of insoluble fatty acid salts that conforms to the irregular contours of the surfaces being coated.

It shall be understood that the chemical ingredient "lime", as that term is used herein, includes both so-called "Quick Lime"—Calcium Oxide (chemical formula CaO)—as well as so-called "Slake" or "Hydrated" Lime—Calcium Hydroxide (chemical formula $Ca(OH)_2$ ).

The present invention will have application wherever a protective coating is desired on surfaces such as bare earth, storage piles of dirt, clay, coal, hay, silage, or other outdoor materials and environmental surfaces requiring protection from the elements such as wind and water.

Insoluble fatty acid salts have traditionally been manufactured and sold in dry, powdered form for various industrial and agricultural applications. The in situ process of the present invention is unique in that it will enable the user to achieve a solid, flexible, and insoluble surface protective coating.

During the formation of the protective coating of the present invention, the coating of liquid fatty acids, preferably applied first, can be applied with either well-known manual or well-known automatic spray equipment such as hand-held sprayers, agricultural sprayers, asphalt sprayers, asphalt distributor trucks, or hydroseeding equipment.

The coating of lime, preferably applied immediately following the application of the liquid fatty acid coating, is applied either in dry form using spreader equipment or in slurry form using the same type of spraying equipment used for applying the fatty acid coating. The typical rate of application of hydrated lime (dry basis) is preferably about 0.75 to 1.0 pound (0.34 to 0.45 Kg.) of lime per pound (0.45 Kg.) of total fatty acid ("TFA") content.

The neutralization reaction between the fatty acids and the lime begins upon contact. It has been found that, for a period of about two days, additional curing continues, resulting in a solid, flexible, and insoluble protective coating.

Figure 3:
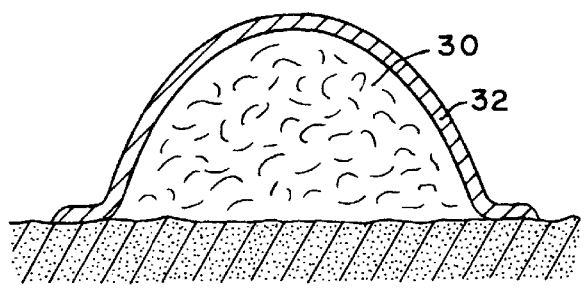
FIG. 3 is a sectional view of a pile of materials covered by the protective coating of the present invention.

The thickness of the coating is a significant factor in determining the degree of protection provided. For wind erosion applications, a light coating may be sufficient. For water protection, the thickness must be sufficient to provide a durable, unbroken coating. Depending on the substrate material and surface characteristics, the coating typically needs to be from about ⅛ to ½ inch (3.18 to 12.7 mm.) in thickness. If the coating is applied too thick, flexibility becomes lost and the coating tends to crack as the covered material shifts or shrinks, as, for example, silage tends to do over time. A sectional view of example materials 30 covered by a protective coating 32 of the present invention is shown in FIG. 3.

The ingredients used in formation of the protective coating of the present invention are either biodegradable or otherwise environmentally safe materials, and have been approved by the USFDA for use as animal feed ingredients. This makes the present invention suitable for broad use in agricultural, commercial, and environmental control applications.

The setting and hardening properties of the protective coating of the present invention also indicated possible utility to prepare liners for various uses. Liners could be used for environmental soil bioremediation in a process generally referred to as landfarming. Landfarming is the land application of contaminated soil and its treatment by indigenous microorganisms. Landfarming is used to remediate petroleum wastes, wood-treating wastes, pesticides, and chlorinated solvent wastes. Often, soil contaminated with these wastes is applied on prepared high density polyethylene (HDPE) liners. Once all the soil is spread, it is covered with a similar liner and allowed to biodegrade. Most landfills also require specifically designed layered liners. Another application of the liner is in landfills. The coating of the present invention appears to be an alternative to traditional liners for both landfarming and landfill applications.

In addition to its physical application as an ingredient of the protective coating liner of the present invention, the soapstock byproduct ingredient could also be used as a source of carbon and nutrients for soil and groundwater remediation. Often, soil contaminated with the above-mentioned wastes is augmented with organic supplements such as molasses, compost, or chicken manure so that biotreatment (the consumption of wastes by microorganisms) can occur more rapidly. Because of its chemical constituent properties, the soapstock byproduct ingredient used in the formation of the protective coating of the present invention could also be a cheaper and more effective alternative additive for remediation.

An additional set of experimental tests of the present invention were made during January through April, 2001, to investigate the effectiveness of the present invention in treating contaminated soil. Bench-scale tests were conducted, and trichloroethylene ("TCE") was chosen as the contaminant for investigation because it is a very common waste at several hazardous sites throughout the world. TCE is known to degrade fairly rapidly by microbial activity under the appropriate environmental conditions. Several species of microorganisms use TCE as a substitute for oxygen during respiration. Therefore, the microorganism respiration process also becomes a TCE degradation or cleanup process. However, because oxygen hinders the degradation process, soil treated in this manner requires sheltering from aeration, and sheltering of soil from aeration was heretofore accomplished in the prior art using plastic liners. The present invention could be an economical alternative to serve the same purpose.

Sand was selected as the soil for testing, and was first spiked with laboratory-grade TCE. Sand was chosen as the tested soil because sand is easier to handle in a bench-scale simulated study performed under controlled conditions. A well-known flexible plastic vapor barrier product sold under the trademark Visquine and available from Sunbelt Manufacturing, Inc., 4611 Central Ave., Monroe, La., was selected as the prior art liner material to compare with the barrier produced by the present invention. Two carbon sources were selected for the tests, namely, the AO-35M soapstock byproduct skimmings sold under the trademark SoyCoat 5 by Valley Products Company, Inc., which, as described hereinabove, is one of the preferred fatty acids sources for use in forming the protective coating of the present invention, and also, as the other and traditional prior art carbon source, molasses, for comparative evaluation purposes.

In order to ensure that biological degradation was rapid, the experiment used microbial sludge from the local wastewater treatment plant to develop a microbial culture that was capable of degrading TCE. This culture was used to dose the soil at the start of the tests so that the sandy soil contained microorganisms that could degrade TCE.

The bench-scale test consisted of five plastic pans, each approximately 16 by 10 by 4 inches (41 by 25 by 10 cm.), that were set up on Jan. 23, 2001. Each pan was filled with soil (sand) that was spiked with small quantities of TCE. The setup of the bench-scale test is summarized in Table 10, below.

TABLE 10

BENCH-SCALE TEST - SUMMARY OF REACTOR SETUP

| Reactor # | Carbon Source | Barrier Cover | Objective |
|---|---|---|---|
| RC1 | Molasses | Visquine | This reactor was also spiked with muriatric acid to kill the microorganisms. This reactor served as the control. |
| RC2 | Molasses | Visquine | This reactor used traditional carbon sources and a traditional liner moisture barrier cover for comparative purposes. |
| RC3 | AO-35M | Visquine | This reactor used a traditional liner moisture barrier cover and AO-35M as the carbon source to examine the effectiveness of AO-35M with traditional liners. |
| RC4 | Molasses | AO-35M with Lime | This reactor used a traditional carbon source with the present invention as a moisture barrier cover to examine the effectiveness of the present invention with traditional carbon sources. |
| RC5 | AO-35M | AO-35M with Lime | This reactor used AO-35M as the carbon source with the present invention as a moisture barrier cover to examine the effectiveness of the present invention to provide a moisture barrier cover and simultaneously provide a carbon source. |

As described hereinabove, each reactor had different carbon sources and different liners, with the objective of comparing the present invention's protective coating with Visquine as well as comparing the effectiveness of using the AO-35M as a carbon source against the effectiveness of traditional carbon source additives such as molasses. All reactors were dosed with the prepared microbial culture and mixed in with the soil. Water was added to fully saturate the soil. Mixing operations were done rapidly but carefully in order to minimize volatilization.

Following addition of all materials, the reactors were covered with barrier covers as indicated above, either a Visquine liner or the protective coating of the present invention. The AO-35M product was poured carefully on the reactors that were to use the protective coating of the present invention as a barrier coating; once the AO-35M product was poured, lime was added to harden the surface in accordance with the method of the present invention.

Soil samples were collected prior to the study (during mixing of the material in each reactor) and three times thereafter. Samples collected during the study were obtained by slitting a small hole in the Visquine-lined reactors, rapidly scooping out about 20 grams of soil into a sampling bottle, and then sealing the reactor again with Visquine and adhesive tape. Samples from the reactors that used the protective coating of the present invention as the barrier cover were obtained by coring a small two-inch (5 cm.) diameter hole in the reactor coating and scraping out the soil for the sample. The cored hole was then filled with the protective coating of the present invention. Samples were then sent to ETC Laboratory in Memphis, Tenn., for analysis. Event dates and analytes are listed in Table 11, below, showing analysis for Volatile Organic Compounds ("VOCs") and Total Organic Carbon ("TOC") at certain points (indicated by an "X") during the experiment.

TABLE 11

SAMPLING AND ANALYSIS PROTOCOL

| Sampling Dates | VOCs | Chloride | TOC |
|---|---|---|---|
| Baseline, Jan. 23, 2001 | X | X | X |
| Feb. 2, 2001 | X | | |
| Mar. 7, 2001 | X | | |
| Apr. 17, 2001 | X | X | |

Sampling results from the four sampling date events are summarized in Tables 12A, 12B, 12C, and 12D, below, which summarize TCE data only among the VOCs, because TCE was the contaminant being examined. TCE data is also shown graphed in FIG. 1.

Table 12A, below, shows the trichloroethylene results in micrograms per kilogram ("$\mu g/kg$") by event date, with the notation "ND" being used to indicate non-detection, and with the notation "J" being used to indicate estimated values.

TABLE 12A

Data Summary of TCE in $\mu g/kg$ by Event Date

| Reactor | 1/23/2001 | 2/2/2001 | 3/7/2001 | 4/17/2001 |
|---|---|---|---|---|
| RC1 | 292 | 206 | 28.2 J | 9.36 |
| RC2 | 971 | 100 ND | 100 ND | 100 ND |
| RC3 | 5,970 | 4,470 | 3,850 | 3,230 |
| RC4 | 676 | 2,040 | 100 ND | 2 ND |
| RC5 | 6,650 | 2,250 | 1,460 | 2 ND |

Table 12B, below, shows the Total Organic Carbon and Chloride results in milligrams per kilogram ("mg/kg") by event date.

TABLE 12B

Data Summary of TOC and Chloride in mg/kg by Event Date

| | TOC (mg/kg) | Chloride (mg/kg) | |
|---|---|---|---|
| Reactor | 1/23/2001 | 1/23/2001 | 4/17/2001 |
| RC1 | 550 | 730 | 696 |
| RC2 | 6,220 | 109 | 59.6 |
| RC3 | 2,530 | 62.6 | 46.1 |
| RC4 | 7,640 | 109 | 138 |
| RC5 | 1,340 | 35.6 | 350 |

Table 12C, below, shows the Total Heterotrophic Plate Counts (in 1000s) by event date.

TABLE 12C

Data Summary of Total Heterotrophic Plate Counts (in 1000s) by Event Date

| Reactor | 1/23/2001 | 3/7/2001 | 4/17/2001 |
|---|---|---|---|
| RC1 | 0.2 | 2.5 | 0.5 |
| RC2 | 8.4 | 8.4 | 8.4 |
| RC3 | | 8.4 | 8.4 |
| RC4 | | 8.4 | 8.4 |
| RC5 | | 8.4 | 8.4 |

Results summarized in Tables 12A, 12B, and 12C show a variation in initial TCE concentrations in each reactor. The reason for the initial variation is because the soil material for testing and TCE spiking was performed independently for each reactor. The control reactor, RC1, had very little TCE to begin with as seen from the baseline sampling results. The low starting concentrations in reactor RC1 are likely due to enhanced mixing particularly during muriatric acid spiking and mixing to kill microorganisms. Subsequent soil mixing in other reactors was performed in a more controlled manner. Tables 12A, 12B, and 12C also show that, despite spiking the RC1 control reactor with muriatic acid, small populations of bacteria managed to survive and gradually degrade the TCE.

Overall, the reactor with the protective coating/covering formed in accordance with the present invention performed as well as the reactor with the Visquine plastic barrier cover when molasses was used as the carbon source. The initial concentrations varied in the two reactors. Reactor RC4, which had the protective coating/covering of the present invention in combination with a molasses carbon source, actually had a higher concentration on the second event date than on the first, which is very likely due to variable mixing and TCE spiking. However, both reactors RC2 and RC4 were non-detect for TCE at the end of the bench-scale study.

Results of the two reactors that used AO-35M as the carbon source both showed TCE degradation. However, TCE degradation in the RC3 reactor, which used AO-35M as the carbon source and a Visquine plastic barrier cover, appeared to be degrading very gradually, whereas reactor RC5, which used AO-35M as the carbon source and also used AO-35M in forming the protective coating of the present invention, degraded more rapidly. The reason for this difference is likely to be the variation in degradative capabilities of microbial populations in the two reactors. The microbial population in RC5 adapted much faster to the AO-35M as compared to reactor RC3; however, the more important observation is that AO-35M performed well both as a carbon source and in formation of the protective cover of the present invention.

Microbial numbers were higher in the active reactors than in the control. Steady populations in the range of $10^3$ colonies per gram showed that the reactors contained sufficient microorganisms to perform the degradation. The reactor that showed the greatest increase in chloride concentration is RC5, which also showed the greatest decrease in TCE. Because chloride is a breakdown product of TCE, these results could indicate that RC5 performed the best for biodegradation purposes.

It is very likely that the reactors that used AO-35M as a carbon source had higher initial TCE concentrations because AO-35M has binding properties that assist the physical-chemical attachment of common contaminants, such as TCE, to it. Comparatively, traditional prior art carbon sources such as molasses do not possess this binding property, making it more likely for contaminants to volatilize. The binding ability of AO-35M thus appears very effective in soil remediation.

Overall, a soapstock byproduct skimmings product such as AO-35M has experimentally been found to be suitable both in forming a protective cover using the method of the present invention and also as a source of carbon for organic contaminant degradation. The results compare very favorably with traditional prior art carbon sources such as molasses and with traditional prior art barrier covers such as Visquine plastic. In addition, when AO-35M was used as the carbon source, the initial TCE concentrations were much higher than when molasses was used, thereby indicating that the product was acting as a binding material to "hold" the contaminant.

The binding property of soapstock byproduct skimmings is seen to have two practical applications. First, several environmental contaminants such as TCE and pentachlorophenol ("PHP") are soluble and leachable in soil systems. In addition, contaminants such as TCE are volatile. Using material such as AO-35M in soil bioremediation processes, such as landfarming, will bind the contaminants and make them more available to microorganisms. Furthermore, contaminants such as pesticides would also likely bind to soapstock byproduct skimmings such as AO-35M in soil bioremediation systems, making them more available to the microorganisms.

The second application of this binding property could be in environmental cleanup technologies such as solidification and stabilization. Both these technologies are commonly used to limit or reduce the release of hazardous constituents from a contaminated soil waste. Often, soil stabilization and solidification use additives such as fly ash, cement kiln dust, Portland cement, and puzzolanic material. Soapstock byproduct skimmings such as AO-35M could be an ideal, economical substitute in such situations.

Additionally, because soapstock byproduct skimmings such as AO-35M, when used to form a protective coating in accordance with the present invention, creates a cover or liner that is substantially, if not totally, impervious to moisture, its use can be extended for landfill applications in addition to soil bioremediation. Landfills need designed impermeable liners. The protective coating formed in accordance with the present invention is impervious to moisture, easy to transport and apply in situ, and sets very rapidly. These properties, in addition to its economical value, utilizing soapstock byproduct skimmings that heretofore were regarded as waste material, make the present invention a promising alternative that merits consideration for use in landfill systems.

Although the present invention has been described and illustrated with respect to a preferred embodiment and a preferred use therefor, it is not to be so limited since modifications and changes can be made therein which are within the full intended scope of the invention.

We claim:

1. A calcium salt protective coating covering a substrate, said protective coating comprising:
   (a) a layer of fatty acids; and
   (b) a coating of lime applied adjacent said layer of fatty acids and chemically reacted with said layer of fatty acids so as to form said calcium salt protective coating.

2. The calcium salt protective coating as recited in claim 1, wherein said lime is Calcium Oxide.

3. The calcium salt protective coating as recited in claim 1, wherein said lime is Calcium Hydroxide.

4. The calcium salt protective coating as recited in claim 1, wherein said fatty acids are vegetable fatty acids.

5. The calcium salt protective coating as recited in claim 4, wherein said vegetable fatty acids are selected from the group consisting of soy fatty acids, corn/soya fatty acids, and fatty acids within soapstock byproduct skimmings.

6. A method of forming a calcium salt protective coating covering a substrate and formed in situ thereupon, said method comprising the steps of:
   (a) providing a substrate;
   (b) spraying a layer of vegetable fatty acids upon said substrate; then
   (c) applying a coating of lime to said layer of vegetable fatty acids so that said lime chemically reacts with said vegetable fatty acids to form said calcium salt protective coating.

7. The method of forming the calcium salt protective coating as recited in claim 6, wherein said lime is Calcium Oxide.

8. The method of forming the calcium salt protective coating as recited in claim 6, wherein said lime is Calcium Hydroxide.

9. The method of forming the calcium salt protective coating as recited in claim 6, wherein said vegetable fatty acids are selected from the group consisting of soy fatty acids, corn/soya fatty acids, and fatty acids within soapstock byproduct skimmings.

10. A method of forming a calcium salt protective coating covering a substrate and formed in situ thereupon, said method comprising the steps of:

(a) providing a substrate;

(b) applying a coating of lime to said substrate;

(c) spraying a layer of vegetable fatty acids onto said coating of lime so that said lime chemically reacts with said vegetable fatty acids to form said calcium salt protective coating.

11. The method of forming the calcium salt protective coating as recited in claim 10, wherein said lime is Calcium Oxide.

12. The method of forming the calcium salt protective coating as recited in claim 10, wherein said lime is Calcium Hydroxide.

13. The method of forming the calcium salt protective coating as recited in claim 10, wherein said vegetable fatty acids are selected from the group consisting of soy fatty acids, corn/soya fatty acids, and fatty acids within soapstock byproduct skimmings.

14. An improved method of environmental soil bioremediation using microorganisms to treat contaminated soil, said method comprising the steps of:

(a) supplementing a contaminated soil with organic supplements and with microorganisms;

(b) providing a liner enclosing the contaminated soil therewithin; and then (c) allowing the microorganisms to degrade contaminant wastes within the contaminated soil;

wherein the improvement comprises:

(d) forming the liner in situ as a calcium salt protective coating by providing a layer of fatty acids adjacent a coating of lime; and then (e) allowing said lime to chemically react with said fatty acids to form the liner as a calcium salt protective coating.

15. The improved method of environmental soil bioremediation as recited in claim 14, wherein said lime is Calcium Oxide.

16. The improved method of environmental soil bioremediation as recited in claim 14, wherein said lime is Calcium Hydroxide.

17. The improved method of environmental soil bioremediation as recited in claim 14, wherein said fatty acids are vegetable fatty acids.

18. The improved method of environmental soil bioremediation as recited in claim 17, wherein said vegetable fatty acids are selected from the group consisting of soy fatty acids, corn/soya fatty acids, and fatty acids within soapstock byproduct skimmings.

19. The improved method of environmental soil bioremediation as recited in claim 18, wherein the organic supplements include said vegetable fatty acids selected from said group.

* * * * *